United States Patent [19]

Lee

[11] Patent Number: 5,216,563
[45] Date of Patent: Jun. 1, 1993

[54] REEL SPRING STRUCTURE FOR A VIDEO TAPE CASSETTE

[75] Inventor: Keun J. Lee, Seoul, Rep. of Korea

[73] Assignee: Youhan Electronics Co., Ltd., Kyeonggi, Rep. of Korea

[21] Appl. No.: 759,547

[22] Filed: Sep. 13, 1991

[30] Foreign Application Priority Data

Sep. 18, 1990 [KR] Rep. of Korea ............... 14340/1990

[51] Int. Cl.[5] ............................................. G11B 23/02
[52] U.S. Cl. ................... 360/132; 360/130.31; 242/199
[58] Field of Search ................ 360/132, 130.3–130.34, 360/137; 242/197–199

[56] References Cited

U.S. PATENT DOCUMENTS

| | | | |
|---|---|---|---|
| 4,662,579 | 5/1987 | Gelardi et al. | 360/132 |
| 4,780,782 | 10/1988 | Bordignon | 360/130.31 |
| 4,899,243 | 2/1990 | Bordignon | 360/132 |
| 5,005,780 | 4/1991 | Carroll | 360/132 |
| 5,042,740 | 8/1991 | Schoettle et al. | 360/132 |
| 5,046,683 | 9/1991 | Carroll | 360/132 |
| 5,094,434 | 3/1992 | Ryu | 360/132 |

Primary Examiner—A. J. Heinz
Assistant Examiner—Alfonso Garcia
Attorney, Agent, or Firm—Spencer, Frank & Schneider

[57] ABSTRACT

An improved reel spring structure for rotatably supporting tape reel shafts of video tape cassette, the spring comprising an elongated strip of resilient material having a flat, central portion having a pair of holes symmetrically formed therein, first inclined portions symmetrically, slopingly provided at the opposite ends of the central portion and each having a rectangular, embossed groove, second inclined portions symmetrically, slopingly provided at the outer ends of the first inclined portions, and rounded tip portions symmetrically provided at the opposite distal ends of the spring to be continued from the second inclined portions, whereby the desired tension on the tape reel shafts can be maintained by a spring having a minimal width.

2 Claims, 3 Drawing Sheets

REEL SPRING STRUCTURE FOR A VIDEO TAPE CASSETTE

BACKGROUND OF THE INVENTION

1. Field of the Invention

This invention relates to a reel spring structure for a video tape cassette.

2. Description of the prior Art

Generally, referring to FIGS. 1-3 a reel spring for a video tape cassette is secured to the inner surface of an upper case section 10 of the cassette, as shown in FIG. 1, and functions to support shafts 12 (FIG. 3) of tape reels on which a video tape is wound, such that in an assembled state of the upper case section 10 and a lower case section 11 (FIG. 2), the tape reel shafts can be smoothly rotated within the cassette.

A prior art reel spring as shown in FIGS. 6 and 7 of the accompanying drawings is disclosed in U.S. Pat. No. 4,770,367. The reel spring is in the form of an elongated strip of constant width (greater than 8 mm) and has a central portion 13 in which is formed a pair of holes 13a for attaching of the spring to the case, and slightly inclined portions 14 at the opposite ends of the central portion 13. Therefore, the reel spring 15 is of a wing-like shape in its overall configuration.

This prior reel spring supports the shafts so that the video tape reels may be smoothly rotated due to the resiliency of the spring per se and the supporting force generated by the inclined portions 14. However, the resiliency of the spring is reduced after a given period of time due to an excessive variation in the tension of the reel spring, so that the spring may lose the necessary supporting force for the tape reel shafts. Therefore, to overcome this, the spring is generally formed to have a width which is greater than 8 mm.

This, however, requires a large quantity of raw material, resulting in a higher manufacturing cost.

SUMMARY OF THE INVENTION

The present invention has been devised in view of the aforesaid problem of the prior art and has as an object to provide an improved reel spring structure which may maintain sufficient tension for smooth driving of tape reel shafts with a spring of minimum of width.

To achieve the above object, there is provided according to the present invention a reel spring structure for a video tape cassette, comprising an elongated strip of resilient material including a flat, central portion having a pair of holes symmetrically formed therein, a pair of first inclined portions symmetrically, slopingly provided at the opposite ends of the central portion and each having a rectangular, embossed groove, a pair of second inclined portions symmetrically, slopingly provided at the outer or distal ends of the first inclined portions, and a pair of rounded tip portions symmetrically provided at the opposite distal ends of the spring to be continued from the second inclined portions.

In another embodiment of the present invention, the first and second inclined portions of the above reel spring structure have widths less than those of the central and rounded tip portions so that the spring does not have the same width throughout.

BRIEF DESCRIPTION OF THE DRAWINGS

The invention will be more fully understood from the following detailed description thereof, taken in connection with the accompanying drawings, in which.

DESCRIPTION OF THE PREFERRED EMBODIMENT

Figure 1:
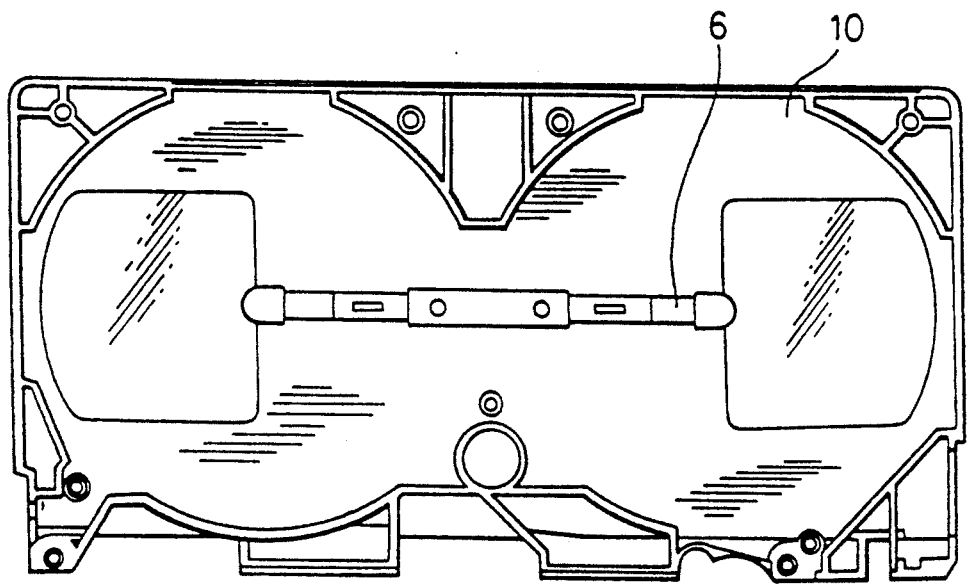
FIG. 1 is a bottom plan view showing the interior of an upper case section of a video tape cassette.
Figure 2:
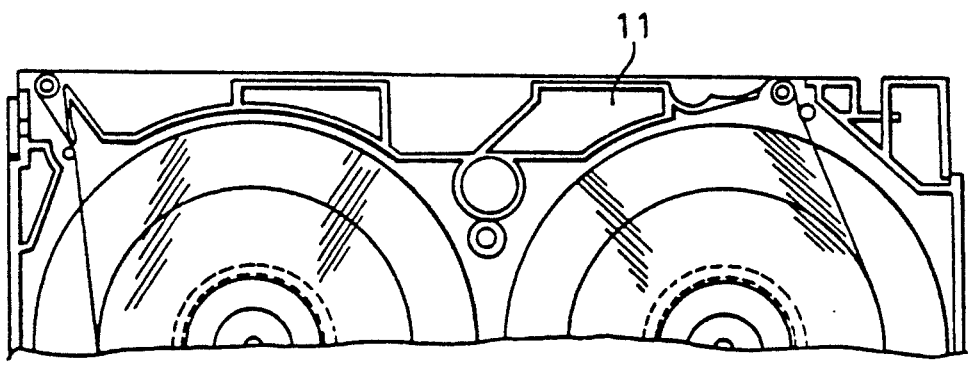
FIG. 2 is a partial top plan view showing the interior of a lower case section of the video tape cassette.
Figure 3:
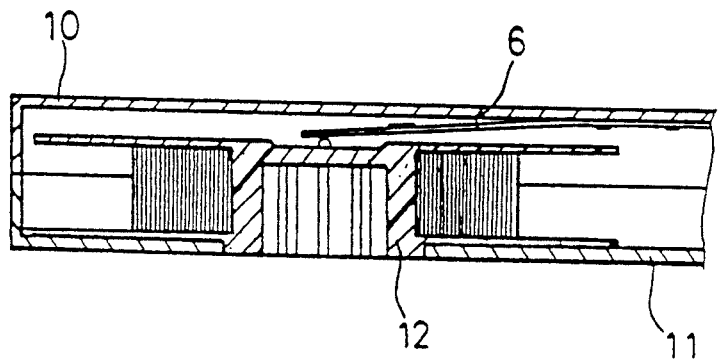
FIG. 3 is a partial section through the video tape cassette.
Figure 4:
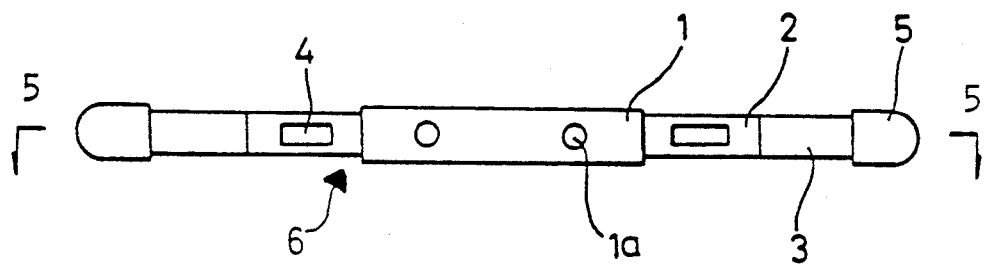
FIG. 4 is a plan view of a reel spring of the present invention.
Figure 5:
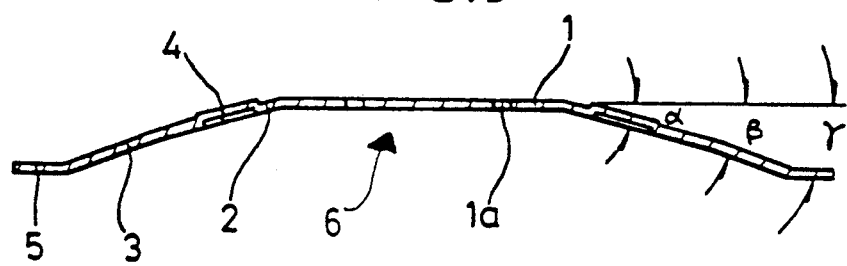
FIG. 5 is a section taken along line 5—5 of FIG. 4.
Figure 6:
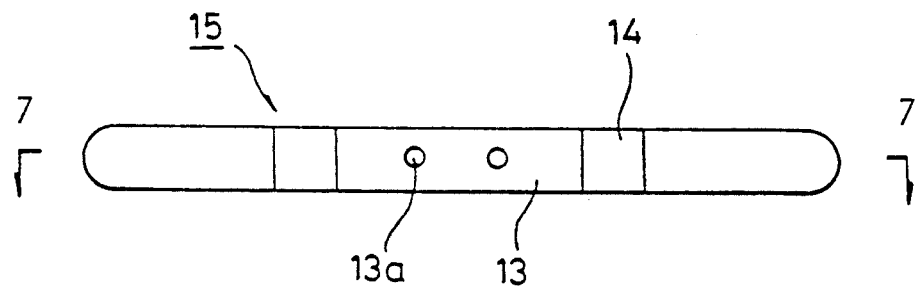
FIG. 6 is a plan view of a reel spring according to the prior art.
Figure 7:
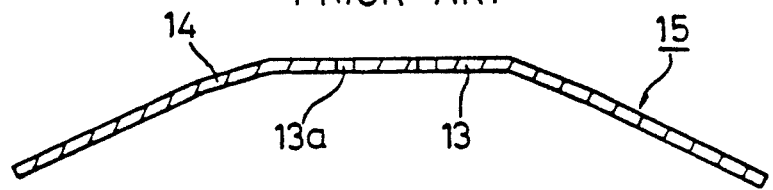
FIG. 7 is a section taken along ling 7—7 of FIG. 6.

Referring to FIG. 4 illustrating a plan view of a reel spring 6 for a video tape cassette according to the present invention, the reel spring comprises an elongated strip of resilient material including a flat, central portion 1 having a pair of holes 1a for attachment of the spring to an upper case section of the video tape cassette. There also are symmetrically formed at the opposite ends of the central portion 1 a pair of first inclined portions 2. As a result, the reel spring has a segmented curved configuration, as shown in FIG. 5.

The first inclined portions 2 are each formed with a rectangular, embossed groove 4 having a size of about 3.5 mm width×about 8 mm length. The embossed grooves 4 formed in the first inclined portions 2 serve to reinforce resiliency of the reel spring 6 during fabrication thereof by stamping in a mold, thereby reducing the width and thickness of the reel spring. The size, depth and shape of the embossed groove 4 may be determined in consideration of the suitable overall resiliency of the reel spring 6 according to the selected size and material of the spring.

In a preferred embodiment, when the size of the embossed groove 4 is selected to be 3.5 mm wide and 8 mm long as mentioned above, the reel spring preferably has a width of 7 mm, which may provide the support function for smooth rotation of the tape reel shafts and maintain the desired tension of the spring.

In addition, the reel spring 6 of the present invention is configured with respect to the plane of the central portion 1 such that the angle "α" (FIG. 5) of inclination of the first inclined portion 2 is 14°, the angle "β" of inclination of the second inclined portion 3 is 21°, and the angle "γ" of inclination of the rounded tip portion 5 is 16°.

In the present invention, the purpose of deflecting the bent portion into the first and second inclined portions 2 and 3 is to increase the resiliency of the reel spring 6 by bending deformation, and permitting a proper change of the bent angle depending upon the material, size and design parameters (i.e., the design requirements of the embossed groove 4) of the reel spring.

As described above, the present invention provides an efficient reel spring which is mounted within the video tape cassette to smoothly rotatably support the tape reel shafts, and which is formed to have the embossed grooves formed therein, thereby permitting variation of the bent portion thereof. As a result, it is possible to further reduce the width of the spring, as compared with the prior art reel springs, resulting in material cost savings of about 20.5% over a conventional 8.8 mm product, and of about 17.6% over another 8.5 mm product, and thus affording a lower manufacturing cost. Furthermore, the reel spring of the present invention is advantageous in that the desired tension of the spring may be maintained for a long time to allow the video tape reels to be smoothly driven.

While a preferred embodiment of the invention has been shown and described, it will be understood that changes and modifications may be made thereto without departing from the spirit and scope of the invention as defined in the appended claims.

What is claimed is:

1. A reel spring structure for a video tape cassette, comprising an elongated strip of resilient material including
   a flat, central portion of a predetermined width, said central portion having a pair of mounting holes symmetrically formed therein;
   a pair of first inclined portions symmetrically, slopingly attached to opposite ends of the central portion, each of said first inclined portions having a rectangular, embossed groove;
   a pair of second inclined portions symmetrically, slopingly attached to opposite distal ends of the first inclined portions, each of said first and second pairs of inclined portions having a width which is less than that of said flat central portion; and
   a pair of inclined rounded tip portions symmetrically attached to opposite distal ends of the second inclined portions, the width of said rounded tip portion being greater than that of said first and second inclined portions, wherein a desired resiliency and tension of said reel spring is maintained to provide support and smooth rotation of tape reel shafts in said cassette.

2. A reel spring structure as climaed in claim 1, wherein said flat central portions defines a plane, and wherein, with respect to said plane, said first inclined portion, second inclined portion, and said rounded tip portion are inclined at angles of 14°, 21° and 16°, respectively.

* * * * *